United States Patent
Sie et al.

(10) Patent No.: US 9,019,222 B2
(45) Date of Patent: Apr. 28, 2015

(54) ELECTRONIC DEVICE AND METHOD FOR MOTION DETECTION OF THE ELECTRONIC DEVICE

(71) Applicant: Chi Mei Communication Systems, Inc., New Taipei (TW)

(72) Inventors: Yun-Long Sie, New Taipei (TW); Her-Ching Shyu, New Taipei (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 32 days.

(21) Appl. No.: 13/798,220

(22) Filed: Mar. 13, 2013

(65) Prior Publication Data
US 2013/0249828 A1    Sep. 26, 2013

(30) Foreign Application Priority Data
Mar. 23, 2012    (TW) .............................. 101110185 A

(51) Int. Cl.
G06F 3/041    (2006.01)
G06F 3/0488    (2013.01)
G06F 1/16    (2006.01)
H04M 1/67    (2006.01)

(52) U.S. Cl.
CPC .............. *G06F 3/041* (2013.01); *G06F 3/0488* (2013.01); *G06F 1/1643* (2013.01); *G06F 1/1694* (2013.01); *H04M 1/67* (2013.01); *H04M 2250/12* (2013.01); *H04M 2250/22* (2013.01)

(58) Field of Classification Search
None
See application file for complete search history.

(56) References Cited

U.S. PATENT DOCUMENTS

2013/0111403 A1*  5/2013  Nakamura ................... 715/810
2013/0241827 A1*  9/2013  Ronkainen ................... 345/157

* cited by examiner

*Primary Examiner* — Muhammad N Edun
(74) *Attorney, Agent, or Firm* — Novak Druce Connolly Bove + Quigg LLP

(57) ABSTRACT

In a method for motion detection of an electronic device, data on a touch screen of the electronic device is shared to a user. The method prevents the touch screen from being touched inadvertently when the electronic device is handed to or is picked up by the user. The method determines whether a movement of the electronic device is generated, wherein the movement is a motion generated when the electronic device is handed to the user. When the movement is generated, the method further locks a display of the touch screen, and determines whether the movement is finished. When the movement is finished, the method unlocks the display of the touch screen.

13 Claims, 2 Drawing Sheets

ELECTRONIC DEVICE AND METHOD FOR MOTION DETECTION OF THE ELECTRONIC DEVICE

BACKGROUND

1. Technical Field

The present disclosure relates to operations of electronic devices, and more particularly to an electronic device and method for motion detection of an electronic device.

2. Description of Related Art

When a user shares data on a touch screen of an electronic device, the electronic device may be handed by other users. In this case, the electronic device needs to be handled carefully by bezels of the electronic device in order to prevent the touch screen from being touched in the process of passing the electronic device from an owner to the other users. If the touch screen is touched inadvertently, data on the touch screen may be changed or lost. Therefore, there is room for improvement in the art.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

In general, the word module, as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable storage medium or other storage system. The non-transitory computer-readable storage medium may include CDs, DVDs, BLU-RAY, flash memory, and hard disk drives.

Figure 1:
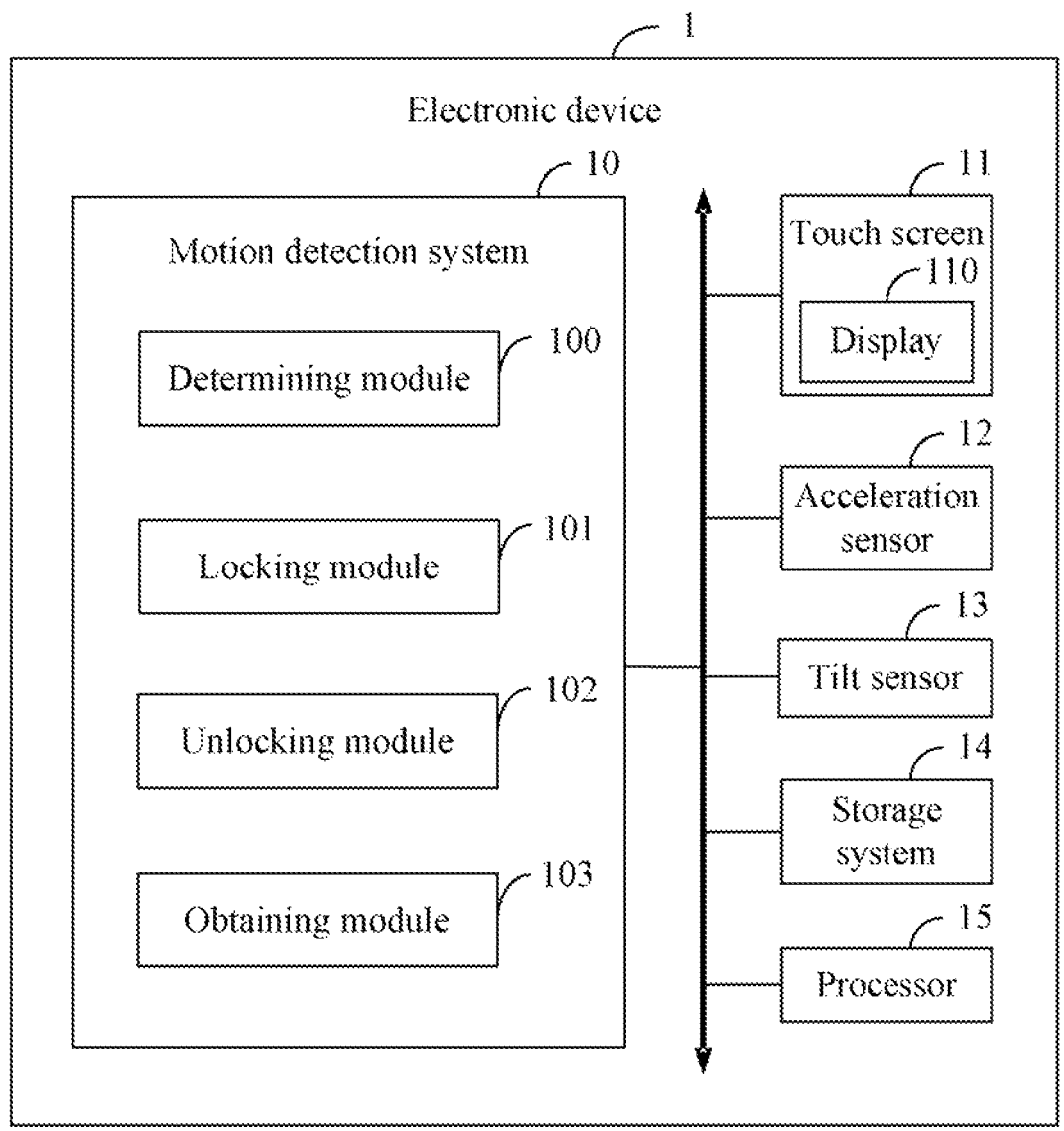
FIG. 1 is a block diagram of one embodiment of an electronic device including a motion detection system.

FIG. 1 is a block diagram of one embodiment of an electronic device 1 including a motion detection system 10. The motion detection system 10 is used to avoid inadvertent operations on the electronic device 1 during movement of the electronic device 1 between an owner and a receiving user. In the embodiment, the electronic device 1 may be a mobile phone, a notebook computer, a personal digital assistant (PDA), a mobile internet device (MID), for example. The electronic device 1 includes a touch screen 11. The touch screen includes a display 110 to display data of the electronic device 1.

The electronic device 1 further includes an acceleration sensor 12 and a tilt sensor 13. The acceleration sensor 12 measures acceleration values of the electronic device 1. The tilt sensor 13 measures angles of inclination of the electronic device 1, where the angles of inclination are relative to a horizontal plane.

In one embodiment, the motion detection system 10 obtains acceleration values of the electronic device 1 measured by the acceleration sensor 12, and determines whether a movement of the electronic device 1 is generated according to the obtained acceleration values. When the movement of the electronic device 1 is generated, the motion detection system 10 locks a display 110 of the touch screen 11 of the electronic device 1. The motion detection system 10 further obtains acceleration values of the electronic device 1 and angles of inclination of the electronic device 1, and determines whether the movement of the electronic device 1 is finished (e.g., stops) according to the obtained acceleration values and the obtained angles of inclination. When the movement of the electronic device 1 is finished, the motion detection system 10 unlocks the display 110 of the touch screen 11 of the electronic device 1.

The electronic device 1 further includes a storage system 14 and at least one processor 15. The storage system 14 stores the data of the electronic device 1. In one embodiment, the storage system 14 may be an internal storage system, such as a random access memory (RAM) for temporary storage of information, and/or a read only memory (ROM) for permanent storage of information. In some embodiments, the storage system 14 may also be an external storage device, such as an external hard disk, a storage card, or a data storage medium. The at least one processor 15 executes one or more computerized codes and other applications of the electronic device 1 to provide the functions of the motion detection system 10.

In one embodiment, the motion detection system 10 may include a determining module 100, a locking module 101, an unlocking module 102, and an obtaining module 103. The modules 100-103 comprise computerized codes in the form of one or more programs that are stored in the storage system 14 of the electronic device 1. The computerized code includes instructions that are executed by the at least one processor 15 of the electronic device 1 to provide functions for the modules. Details of each of the modules are given in FIG. 2.

Figure 2:
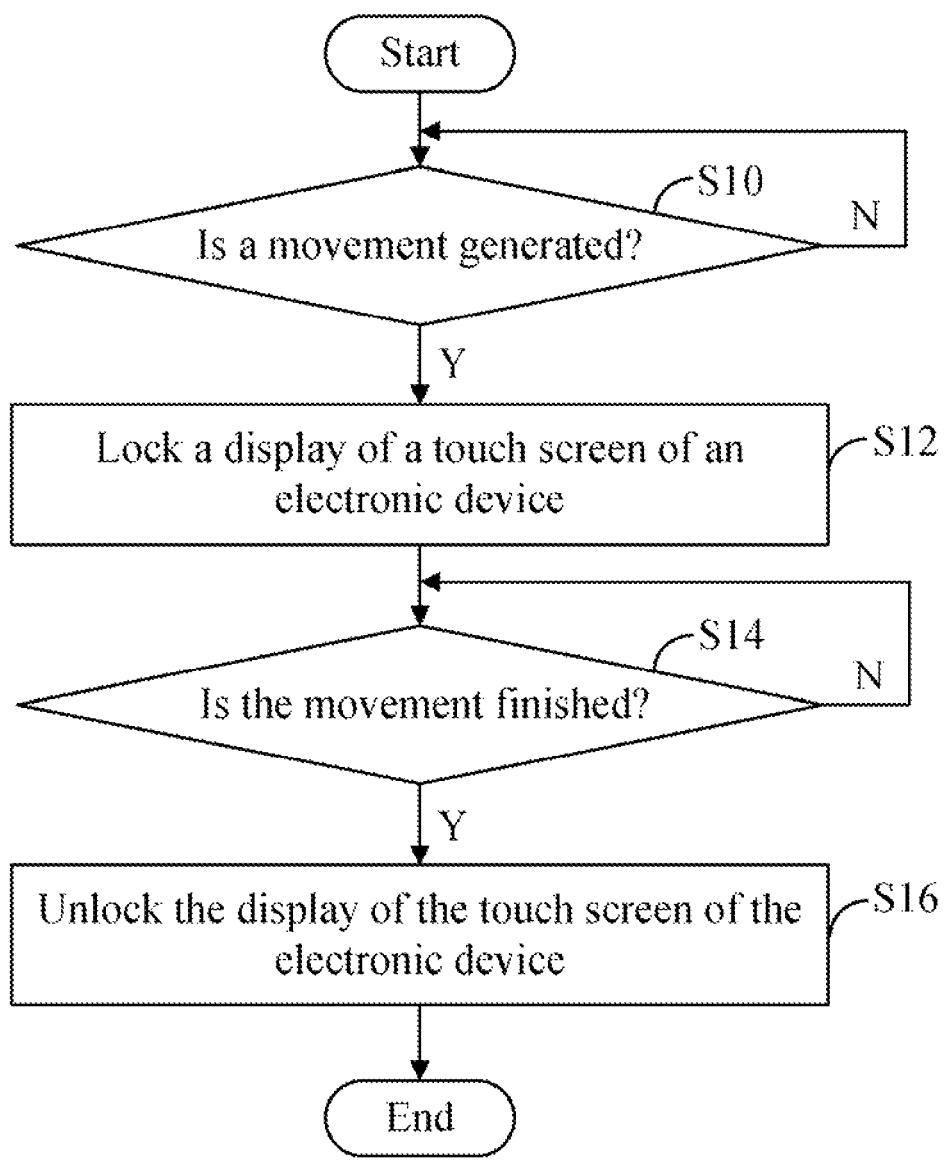
FIG. 2 is a flowchart of one embodiment of a method for motion detection of the electronic device of FIG. 1.

FIG. 2 is a flowchart of one embodiment of a method for motion detection of the electronic device 1 of FIG. 1. Depending on the embodiment, additional steps may be added, others deleted, and the ordering of the steps may be changed.

In step S10, the determining module 100 determines whether a movement of the electronic device 1 is generated by someone passing the electronic device 1 to another person. In one example, the movement could be a motion that the electronic device 1 is passed from an owner to a receiving user. If the movement is generated, step S12 is implemented. If the movement is not generated, step S10 is repeated. In one embodiment, the electronic device 1 moves a short distance from the owner to the receiving user with acceleration values within a default acceleration range. The default acceleration range is user-determined or pre-determined, and is obtained by experimental summary, for example, summarizing acceleration values that are obtained when the movement is generated.

In one embodiment, the obtaining module 103 obtains the acceleration values measured by the acceleration sensor 12, then the determining module 100 determines whether the obtained acceleration values are within the default acceleration range in a time interval. The time interval is user-determined or pre-determined, and is determined by the time that is required to hand the electronic device 1 to the receiving user, for example, 1 second. If the obtained acceleration values are within the default acceleration range in the time interval, the determining module 100 determines that the movement is generated. If the obtained acceleration values are not within the default acceleration range in the time interval, the determining module 100 determines that the movement is not generated.

In other embodiments, a camera device of the electronic device 1 is used to capture images of the receiving user. The determining module 100 first determines whether an image of the receiving user is obtained by the camera device of the electronic device 1, and then determines whether a movement of the electronic device 1 is generated. In this way, the determining module 100 can reduce the likelihood of a mistaken determination. In one example, if the image of the receiving user is obtained by the camera device of the electronic device 1, then step S10 is implemented.

In step S12, the locking module 101 locks the display 110 of the touch screen 11 of the electronic device 1. When the display 110 of the touch screen 11 is locked, the touch screen 11 does not turn off. In other words, the electronic device 1 can detect touch operation of users that press on the touch screen 11, but the touch screen 11 does not display content of the electronic device 1 corresponding to the touch operation of the users. In one embodiment, the locking module 101 gives a prompt that the display 110 of the touch screen 11 is locked, for example, masking the touch screen 11 in a translucent manner.

In step S14, the determining module 100 determines whether the movement is finished. If the movement is finished, step S16 is implemented. If the movement is not finished, step S14 is repeated. After the receiving user picks up or grabs the electronic device 1, the electronic device 1 constitutes of an angle of inclination when the receiving user views the touch screen 11 of the electronic device 1, where the angle of inclination is relative to the horizontal plane. At the same time, the touch screen 11 may be touched inadvertently by the receiving user when the receiving user views the touch screen 11 of the electronic device 1.

In one embodiment, the obtaining module 103 obtains acceleration values of the electronic device 1 and angles of inclination of the electronic device 1, then the determining module 100 determines whether the obtained acceleration values are not within the default acceleration range in the time interval. The determining module 100 further determines whether the obtained angles of inclination are within a default angle range in the time interval. The default angle range is user-determined or pre-determined, and is obtained by experimental summary, for example, summarizing angles of inclination that is obtained when the receiving user views the touch screen 11 of the electronic device 1. If the obtained acceleration values are not within the default acceleration range in the time interval, and the obtained angles of inclination are within the default angle range in the time interval, the determining module 100 determines that the movement is finished. If the obtained acceleration values are within the default acceleration range in the time interval, or the obtained angles of inclination are not within the default angle range in the time interval, the determining module 100 determines that the movement is not finished.

In other embodiments, the obtaining module 103 obtains acceleration values of the electronic device 1, then the determining module 100 determines whether the obtained acceleration values are within the default acceleration range in the time interval. The determining module 100 further determines whether the touch screen 11 is touched by the receiving user. If the obtained acceleration values are not within the default acceleration range in the time interval, and the touch screen 11 is touched by the receiving user, the determining module 100 determines that the movement is finished. If the obtained acceleration values are within the default acceleration range in the time interval, or the touch screen 11 is not touched by the receiving user, the determining module 100 determines that the movement is not finished. A prompt may be given on the touch screen 11 to guide the receiving user to touch the touch screen 11.

In step S16, the unlocking module 102 unlocks the display 110 of the touch screen 11 of the electronic device 1.

In the present disclosure, during the process of passing the electronic device 1 from the owner to the receiving user, the display 110 of the touch screen 11 is locked. The electronic device 1 is prevented from inadvertent operations touched on the touch screen 11. It is convenient to hand the electronic device 1 to a receiving user or for a receiving user to pick up the electronic device 1 to share the data, and is efficient to maintain that the data is secure on the touch screen 11 of the electronic device 1.

The described embodiments are merely possible examples of implementations, and have been set forth for a clear understanding of the principles of the present disclosure. Many variations and modifications may be made without departing substantially from the spirit and principles of the present disclosure. All such modifications and variations are intended to be included within the scope of this disclosure and the described inventive embodiments, and the present disclosure is protected by the following claims.

What is claimed is:

1. A computerized-method for motion detection of an electronic device, the method comprising steps of:
    determining whether a movement of the electronic device is generated, wherein the movement is a motion generated when the electronic device is handed to a user;
    locking a display of a touch screen of the electronic device when the movement is generated;
    determining whether the movement is finished; and
    unlocking the display of the touch screen of the electronic device when the movement is finished.

2. The method as claimed in claim 1, wherein the step of determining whether the movement is generated comprises:
    obtaining acceleration values measured by an acceleration sensor of the electronic device;
    determining whether the obtained acceleration values are within a default acceleration range in a time interval;
    determining that the movement is generated when the obtained acceleration values are within the default acceleration range in the time interval; and
    determining that the movement is not generated when the obtained acceleration values are not within the default acceleration range in the time interval.

3. The method as claimed in claim 1, wherein the step of determining whether the movement is finished comprises:
    obtaining acceleration values measured by an acceleration sensor of the electronic device;
    obtaining angles of inclination measured by a tilt sensor of the electronic device;
    determining whether the obtained acceleration values are not within a default acceleration range in a time interval;
    determining whether the obtained angles of inclination are within a default angle range in the time interval;
    determining that the movement is finished when the obtained acceleration values are not within the default acceleration range in the time interval and the obtained angles of inclination are within the default angle range in the time interval; and
    determining that the movement is not finished when the obtained acceleration values are within the default acceleration range in the time interval or the obtained angles of inclination are not within the default angle range in the time interval.

4. The method as claimed in claim 1, wherein the step of determining whether the movement is finished comprises:
  obtaining acceleration values measured by an acceleration sensor of the electronic device;
  determining whether the obtained acceleration values are within a default acceleration range in a time interval;
  determining whether the touch screen of the electronic device is touched by the user;
  determining that the movement is finished when the obtained acceleration values are not within the default acceleration range in the time interval and the touch screen of the electronic device is touched by the user; and
  determining that the movement is not finished when the obtained acceleration values are within the default acceleration range in the time interval or the touch screen of the electronic device is not touched by the user.

5. A non-transitory computer readable storage medium storing a set of instructions that, when executed by at least one processor of an electronic device, causes the at least one processor to perform a method for motion detection of an electronic device, the method comprising steps of:
  determining whether a movement of the electronic device is generated, wherein the movement is a motion generated when the electronic device is handed to a user;
  locking a display of a touch screen of the electronic device when the movement is generated;
  determining whether the movement is finished; and
  unlocking the display of the touch screen of the electronic device when the movement is finished.

6. The storage medium as claimed in claim 5, wherein the step of determining whether the movement is generated comprises:
  obtaining acceleration values measured by an acceleration sensor of the electronic device;
  determining whether the obtained acceleration values are within a default acceleration range in a time interval;
  determining that the movement is generated when the obtained acceleration values are within the default acceleration range in the time interval; and
  determining that the movement is not generated when the obtained acceleration values are not within the default acceleration range in the time interval.

7. The storage medium as claimed in claim 5, wherein the step of determining whether the movement is finished comprises:
  obtaining acceleration values measured by an acceleration sensor of the electronic device;
  obtaining angles of inclination measured by a tilt sensor of the electronic device;
  determining whether the obtained acceleration values are not within a default acceleration range in a time interval;
  determining whether the obtained angles of inclination are within a default angle range in the time interval;
  determining that the movement is finished when the obtained acceleration values are not within the default acceleration range in the time interval and the obtained angles of inclination are within the default angle range in the time interval; and
  determining that the movement is not finished when the obtained acceleration values are within the default acceleration range in the time interval or the obtained angles of inclination are not within the default angle range in the time interval.

8. The storage medium as claimed in claim 5, wherein the step of determining whether the movement is finished comprises:
  obtaining acceleration values measured by an acceleration sensor of the electronic device;
  determining whether the obtained acceleration values are within a default acceleration range in a time interval;
  determining whether the touch screen of the electronic device is touched by the user;
  determining that the movement is finished when the obtained acceleration values are not within the default acceleration range in the time interval and the touch screen of the electronic device is touched by the user; and
  determining that the movement is not finished when the obtained acceleration values are within the default acceleration range in the time interval or the touch screen of the electronic device is not touched by the user.

9. An electronic device, comprising:
  a touch screen;
  a storage system;
  at least one processor; and
  one or more programs that are stored in the storage system and executed by the at least one processor, the one or more programs comprising instructions to:
  determine whether a movement of the electronic device is generated, wherein the movement is a motion generated when the electronic device is handed to a user;
  lock a display of the touch screen when the movement is generated;
  determine whether the movement is finished; and
  unlock the display of the touch screen when the movement is finished.

10. The electronic device as claimed in claim 9, wherein the one or more programs further comprising instructions to:
  obtain acceleration values measured by an acceleration sensor of the electronic device.

11. The electronic device as claimed in claim 9, wherein whether the movement is generated is determined comprises steps of:
  obtaining acceleration values measured by an acceleration sensor of the electronic device;
  determining whether the obtained acceleration values are within a default acceleration range in a time interval;
  determining that the movement is generated when the obtained acceleration values are within the default acceleration range in the time interval; and
  determining that the movement is not generated when the obtained acceleration values are not within the default acceleration range in the time interval.

12. The electronic device as claimed in claim 9, wherein whether the movement is finished is determined comprises steps of:
  obtaining acceleration values measured by an acceleration sensor of the electronic device;
  obtaining angles of inclination measured by a tilt sensor of the electronic device;
  determining whether the obtained acceleration values are not within a default acceleration range in a time interval;
  determining whether the obtained angles of inclination are within a default angle range in the time interval;
  determining that the movement is finished when the obtained acceleration values are not within the default acceleration range in the time interval and the obtained angles of inclination are within the default angle range in the time interval; and
  determining that the movement is not finished when the obtained acceleration values are within the default acceleration range in the time interval or the obtained angles of inclination are not within the default angle range in the time interval.

13. The electronic device as claimed in claim 9, wherein whether the movement is finished is determined comprises steps of:

obtaining acceleration values measured by an acceleration sensor of the electronic device;

determining whether the obtained acceleration values are within a default acceleration range in a time interval;

determining whether the touch screen is touched by the user;

determining that the movement is finished when the obtained acceleration values are not within the default acceleration range in the time interval and the touch screen is touched by the user; and determining that the movement is not finished when the obtained acceleration values are within the default acceleration range in the time interval or the touch screen is not touched by the user.

* * * * *